I. A. EPPSTEIN.
TOOTH STRUCTURE.
APPLICATION FILED JULY 5, 1917.

1,263,752.

Patented Apr. 23, 1918.

INVENTOR
Isadore A. Eppstein.
By Owen, Owen & Crampton,
His attys.

UNITED STATES PATENT OFFICE.

ISADORE A. EPPSTEIN, OF TOLEDO, OHIO.

TOOTH STRUCTURE.

1,263,752.

Specification of Letters Patent.   Patented Apr. 23, 1918.

Application filed July 5, 1917.   Serial No. 178,774.

*To all whom it may concern:*

Be it known that I, ISADORE A. EPPSTEIN, a citizen of the United States, and a resident of Toledo, in the county of Lucas and State of Ohio, have invented a certain new and useful Tooth Structure; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to dentistry, and particularly to an artificial facing for both natural and artificial teeth.

The object of my invention is to produce a tooth having a hard enameled surface and in appearance resembling a natural tooth or the tooth adjoining.

The invention is fully described in the following specification, and while, in its broader aspect, it is capable of embodiment in numerous forms, two embodiments thereof are illustrated in the accompanying drawings, in which,—

Figure 1:
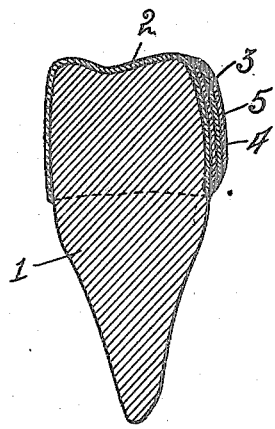
Figure 2:
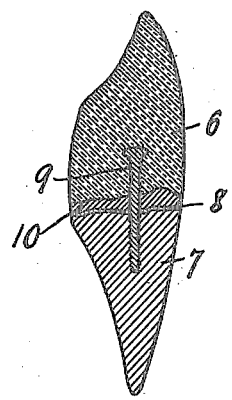

Figure 1 is a longitudinal section of a gold crowned tooth embodying my invention, and Fig. 2 is a similar section of a porcelain Logan crown embodying the invention.

Referring to Fig. 1 of the drawings, 1 designates a tooth body having a gold crown 2 mounted thereon, and the facing, in which my invention resides and which may be placed on the front exposed portion of the tooth or at any other point thereon, comprises, in the present instance, an enamel body coat 3, a paint coat 4 to give the enamel 3 the appearance of a natural tooth, or to preferably match the adjoining tooth, and a transparent surface enamel coat 5.

The enamel coat 3, which may be applied to a natural or porcelain tooth, as well as to a gold crown, comprises a white or opaque silica or crystal glass enamel which in the form generally used comprises silica 30 parts, antimoniate of soda 10 parts, saltpeter 1 part, and peroxid of tin or lead in an amount substantially equal to the weight of the silica used. The transparent enamel 5 preferably comprises the same composition as that of the body enamel except that the peroxid of tin or lead, which renders the enamel opaque, is omitted. These enamels are carried in stock by different dealers and are usually obtained in lump form, the opaque enamel being ordered under the name of "white enamel" and the transparent enamel being usually ordered under the name of "fondant enamel." It is found in practice that the ingredients and proportions thereof of these enamels vary somewhat for different dealers, but the ingredients and proportions above mentioned are substantially those which are more generally used. It is to be understood, however, that these ingredients and the proportions mentioned may be varied considerably without departing from the spirit of the invention. The paint employed for the color coating 4 is termed "porcelain paint" and can be obtained from different dealers.

In facing a tooth embodying my invention, the method preferably practised is substantially as follows: The surface to be enameled, whether such surface comprises enamel, porcelain, gold or other material, is preferably scratched or roughened for retention purposes and after being cleaned a coat of opaque enamel 3 in paste form is applied. The article is then heated to fuse the enamel, and after cooling, the baked enamel body coat 3 is ground or polished to trim the same. The color coat 4 is then applied to give the enamel body coat the desired color, and the article is again heated to effect a baking of such color coat. When the desired color has been obtained the color coat is covered with a coat of transparent enamel 5 and the article then heated to bake the same. This procedure results in an exceedingly hard enamel, which corresponds in color and appearance to the tooth or teeth upon which or next to which the enamel is placed.

To build up a porcelain crown in a manner embodying the invention the crown (Fig. 2) is first shaped so that the buccal gingival margin fits the root 7 to which it is to be applied. The crown is then removed and a piece of gold 8 burnished upon the exposed end of the root. A small quantity of body or opaque enamel is then applied in a generous lump to the inner end of the porcelain crown where it adjoins the retaining pin 9. The crown is then placed in position on the root and the enamel spreads out under the pressure and forms a layer 10 between the gold and the crown. This having been done, the crown with the enamel and gold attached to the pin thereof is carefully removed from the mouth and baked. Should any of the enamel be exposed it may be brought to proper color by applying a color coat and an outer transparent enamel coat to the exposed surface.

While I have described with more or less detail the method employed in facing or building up a tooth embodying my invention, no claim is made in the present application for the process by which the article is made, claims for the process being reserved for another application.

I wish it understood that my invention is not limited to any specific construction, arrangement, form or proportion of the parts, as it is capable of numerous modifications and changes without departing from the spirit of the claims.

Having thus described my invention, what I claim as new and desire to secure by Letters Patent is:—

1. A tooth having a fused surface coating of silica enamel, a color coat for said enamel, and a fused transparent silica enamel coat over the color coat.

2. A tooth having an opaque silica enamel coat fused thereon, said enamel comprising silica, antimoniate of soda, salt-peter and peroxid of metal in substantially the proportions described, a porcelain paint color coat deposited over said enamel coat, and a transparent silica enamel coat fused on the color coat.

In testimony whereof, I have hereunto signed my name to this specification

ISADORE A. EPPSTEIN.